March 29, 1966 R. D. RIVERS 3,242,655
HIGH EFFICIENCY UNIT FILTER ASSEMBLY
Filed May 1, 1964
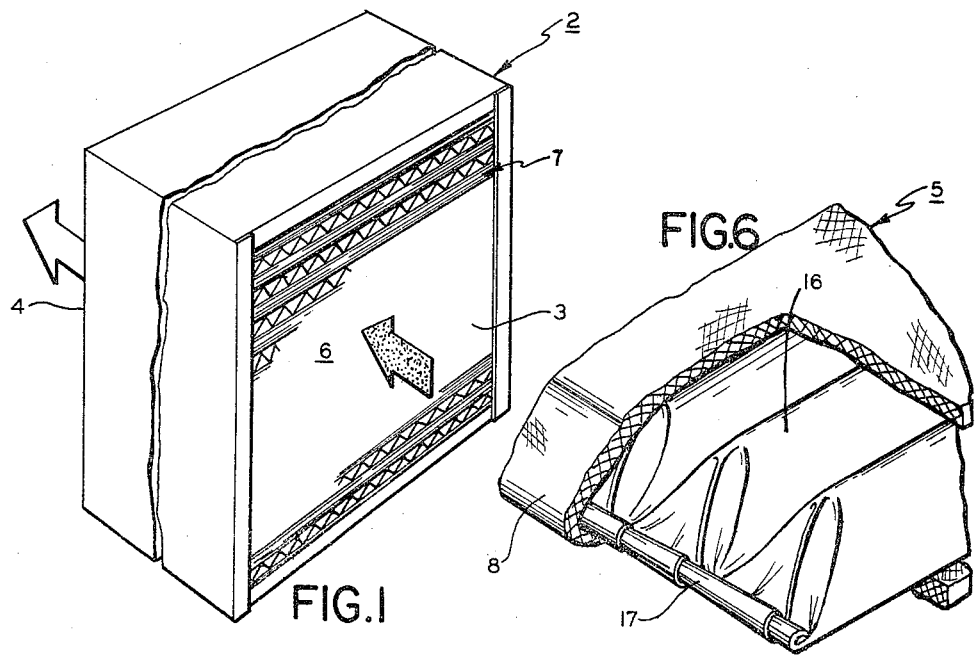
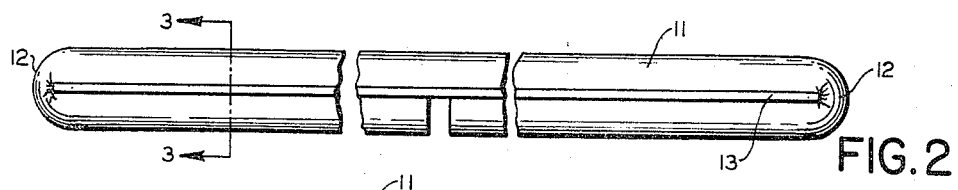
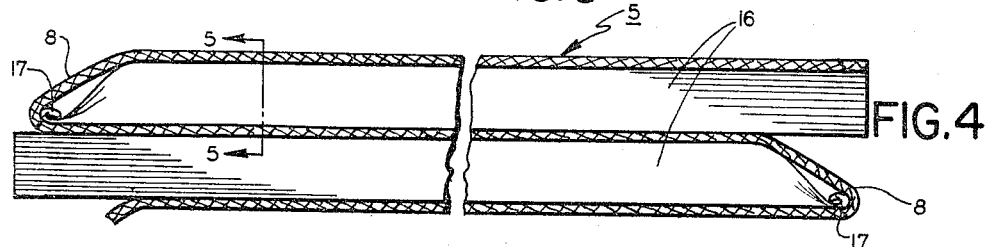
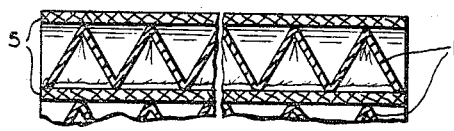
INVENTOR.
RICHARD D. RIVERS
BY
Ralph B. Brick
ATTORNEY

United States Patent Office 3,242,655
Patented Mar. 29, 1966

3,242,655
HIGH EFFICIENCY UNIT FILTER ASSEMBLY
Richard D. Rivers, Louisville, Ky., assignor to American Air Filter Company, Inc., Louisville, Ky., a corporation of Delaware
Filed May 1, 1964, Ser. No. 364,126
1 Claim. (Cl. 55—500)

This invention relates to unit type filters and more particularly to high efficiency unit filters of the pleated type.

In high efficiency unit filters, it long has been known in the art to construct a filter core of pleated filter material from a strip of filter medium folded upon itself in longitudinally spaced intervals. The folds of the pleats have been separated by corrugated spacer members extending into the pleats from opposite sides of the filter core to provide gas passages to the extended filtering surfaces. After the filter core has been formed, it has been mounted in an open-ended frame and sealed therein with a suitable sealing material applied along the longitudinal edges of the core.

One of the problems which has occurred with filter cores in the past has been the tearing of the filter medium forming the pleats. This has produced undesirable gas leakage and inefficient filtering, the problem being of a particularly critical nature in situations where filtering of toxic contaminants from a gas stream has been required.

The present invention, recognizing the critical areas of wear and tear of the pleated filter material, provides a straightforward and economical arrangement to minimize such wear and tear. In addition, the present invention provides novel spacer member arrangements incorporating the principal features of the present invention in an economical and readily constructable manner to provide more stable and efficient filter cores.

Various other features of the present invention will become obvious to one skilled in the art upon reading the disclosure set forth herein.

More particularly, the present invention provides a filter comprising a strip of filter medium folded upon itself in longitudinally spaced intervals to provide a plurality of stacked pleats with successively alternating pleat fold-turns; a plurality of corrugated spacer members disposed within and extending along the length of said pleats to space the same; and means extending across and cooperating with the transverse edges of the spacer members adjacent the pleat fold-turns to round off the edges to avoid tearing.

It is to be understood that various changes can be made in the arrangement, form and construction of the apparatus disclosed herein without departing from the scope or spirit of the present invention.

Referring to the drawing which discloses one advantageous embodiment of the present invention:

FIGURE 1 is a broken perspective view of a unit filter assembly incorporating features of the present invention;

FIGURE 2 is an enlarged broken side view of a corrugated spacer member incorporating one embodiment of the present invention which can be utilized with the pleated filter arrangement of FIGURE 1;

FIGURE 3 is a broken cross-sectional view taken in a plane passing through lines 3—3 of FIGURE 2;

FIGURE 4 is an enlarged broken side view of another corrugated spacer member embodiment which can be utilized with the structure of FIGURE 1;

FIGURE 5 is a broken cross-sectional view taken in a plane passing through lines 5—5 of FIGURE 4; and FIGURE 6 is a partially broken away enlarged perspective view of the corrugated spacer member of FIGURES 4 and 5 in cooperation with pleated filter material.

Referring to the drawing, the inventive filter assembly is disclosed as including open-ended rectangular housing 2 having upstream dirty gas inlet 3 and downstream clean gas outlet 4. Housing 2 can be made from any one of a number of known rigid, stable materials and advantageously, it can be made from a pre-selected gauge metal or treated wood capable of withstanding high temperatures to which the filter assembly might be exposed.

Disposed within housing 2 and sized to extend fully between opposite walls thereof is filter core 6. Core 6 is comprised of a continuous strip of filter medium 5 folded back and forth upon itself at longitudinally spaced intervals to provide a plurality of stacked pleats 7 with successively alternating pleat fold-turns 8. It is to be understood that any one of a number of known filter materials can be utilized in the inventive filter assembly. Advantageously, a filter medium having fibers of submicron diameter size capable of operating at efficiencies above ninety-nine percent (99%) can be utilized. For example, glass fiber filter medium having fiber diameters of approximately 0.7 micron to approximately 0.8 micron can be used, as can certain types of submicron organic filter materials.

Disposed within and extending along the length of the pleats to space the pleats and maintain them in open position to accommodate the dirty gas stream to be treated are a plurality of alternately arranged corrugated spacer members.

As disclosed in FIGURES 2 and 3 of the drawing, spacer members 11 can be provided. These spacer members can be formed from sheets of thin, corrugated, substantially rigid material, such as thin metal foil or paper. Each sheet of material is folded upon itself at opposite extremities thereof in 180-degree fashion along lines extending transverse the corrugation to provide rounded edges 12 and a plurality of corrugations along the opposed faces thereof, the rounded edges 12 serving to nest with the pleat fold-turns 8 to minimize wear and tear along such turns, and the corrugations on either side of the spacer member providing additional linear passages for the gas stream to be treated. It is to be noted that a substantially flat backing sheet 13 of material similar to the material of the corrugated sheet can be adhesively laminated to the corrugated sheet to increase the stability of the spacer and to facilitate assembly. This backing sheet 13 need be only half the length of the corrugated sheet and of equal breadth in order to serve both corrugated faces of a spacer member. It, of course, is to be understood that, if desired, the laminated sheet can extend the full length of a spacer member, thus providing a double-wall lamination intermediate the corrugated faces to insure additional stability.

As disclosed in FIGURES 4 to 6 of the drawing, corrugated spacer members 16 can be provided in the filter core 6. These spacer members also can be formed from sheets of thin corrugated material such as metal foil or paper. In the disclosed embodiment, the transverse edge of each spacer member 16 employed adjacent a pleat fold-turn 8 is folded upon itself as at 17. The folded edge 17 incorporates flattened corrugations of the spacer member providing a structurally stable, rounded nesting surface to minimize wear and tear of the filter medium at the fold-turn.

Once a strip of filter medium 5 has been folded upon itself at longitudinally spaced intervals with the folds of the pleats separated by spacer members of a type either like that disclosed in FIGURES 2 and 3 or like that disclosed in FIGURES 4 to 6 to form finished core 6, core 6 is then prepared for insertion into open-ended housing 2. In order to fix core 6 in housing 2 in sealed relationship therewith so that the incoming dirty gas does not bypass the core, a suitable sealant is provided around the perimeter of core 6 to seal the core firmly within housing 2 to prevent leakage of the gas stream therearound. The sealant can be formed from any one of a number of known adhesives such as plastic, ceramic or rubber-base adhesive materials. The seal can be formed by applying the sealant along the inner walls of the housing 2 and then inserting the core from either the downstream or upstream end allowing the sealant to set with the core properly in position.

The invention claimed is:

A filter comprising a strip of filter medium folded upon itself at longitudinally spaced intervals to provide a plurality of stacked pleats with successively alternating pleat fold-turns; and a plurality of corrugated spacer members disposed within and extending along the lengths of said pleats to space the same, said spacer members having their corrugations flattened along at least the transverse edge thereof which nests with an adjacent pleat fold-turn with the flattened portion rolled upon itself in tight roll form to provide an integral rod-like body presenting a rounded face which nests with the said adjacent pleat fold-turn to minimize wear and tear at such fold-turn.

References Cited by the Examiner

UNITED STATES PATENTS

| | | | |
|---|---|---|---|
| 1,890,499 | 12/1932 | Davies | 55—521 X |
| 2,020,120 | 11/1935 | Leathers | 55—341 |
| 2,409,078 | 10/1946 | Swann | 55—521 X |
| 2,884,091 | 4/1959 | Baldwin | 55—500 |
| 2,952,333 | 9/1960 | Bush | 55—500 |
| 3,143,503 | 8/1964 | Schmidt et al. | 210—495 X |
| 3,146,197 | 8/1964 | Getzin | 55—497 X |
| 3,173,777 | 3/1965 | Tammy | 55—521 X |

ROBERT F. BURNETT, *Primary Examiner.*